united States Patent Office 3,071,557
Patented Jan. 1, 1963

3,071,557
SEGMENTED POLYMERS
August Henry Frazer, Wilmington, Del., and Joseph Clois Shivers, Jr., Westchester, Pa., assignors to E. I. du Pont de Nemours and Company, Wilmington, Del., a corporation of Delaware
No Drawing. Filed Mar. 28, 1958, Ser. No. 724,515
17 Claims. (Cl. 260—32.6)

This invention is concerned with elastic polymeric materials, solutions of such materials, and shaped structures formed therefrom.

It is an object of the present invention to provide a novel composition of matter characterized by its ability to form elastic shaped structures. Another object is to provide novel shaped structures having elastic characteristics. A further object is to provide a novel liquid useful in the preparation of shaped structures having elastic characteristics. These and other objects will become apparent in the course of the following specification and claims.

The novel elastic polymers of the present invention are segmented, substantially linear polymers consisting of alternating first and second segments. The first or "soft" segment is the residue, after removal of terminal active hydrogen from a polymer melting below 60° C., having a molecular weight above 700, and containing terminal radicals possessing active hydrogen. The second segment comprises at least one repeating unit of a nitrogen-containing polymer such as a urea, urethane or bisureylene polymer having a melting point above about 200° C. in its fiber-forming molecular weight range (i.e., above 10,000). In addition, the second segment must contain within its polymer chain a trialkyl substituted m-phenylene dicarbamyl radical attached to said chain through said meta positioned groups, with those nuclear carbons adjacent to the points of ring attachment bearing lower alkyl (i.e., 1–4 carbons) groups free of a tertiary carbon atom.

To produce polymers which are elastomers at room temperature, it is required that the "soft" segments comprise about 60 to 95% by weight of the polymeric product.

The segmented polymer has the following repeating structure:

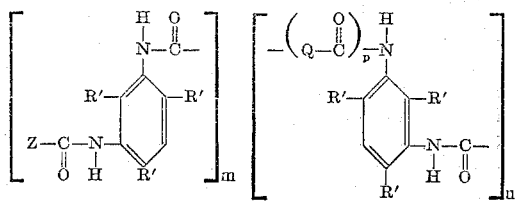

wherein R' is lower alkyl, i.e., one to four carbon atoms, Z is a bivalent organic radical which is inert to isocyanate groups, p is a cardinal number not greater than 1, m and n are small whole numbers, i.e., from about 1 to about 10, and Q is a divalent chain extending radical, preferably a member of the class consisting of hydrazo and organic diamino. More particularly, Z is the residue after removal of terminal active hydrogen from a polymer melting below 60° C., having a molecular weight above 700 and containing terminal radicals possessing active hydrogen. While the hindering groups R' may be the same or different, for improved polymer properties, it is preferred that they be alike.

The "soft" segments can be obtained from polymers having a molecular weight as high as 8,000 and higher providing the polymer has a melting point below about 60° C. Such polymeric functional compounds must contain terminal radicals possessing active hydrogen, as for instance, —OH, —NH$_2$, —SH, —COOH, —CO—NH$_2$, CS—NH$_2$, —SO$_2$NH$_2$, and —SO$_2$OH.

The polymer from which the "soft" segment in the elastomer is derived may contain a single type of linkage such as in the conventional polyesters, polyethers, etc., or it may have more than one type of linkage, as in the polyesters and polyethers, chain-extended with diisocyanates. In the latter case, the diisocyanates used may or may not be hindered aromatic diisocyanates having lower alkyl groups attached to nuclear carbon atoms vicinal to the isocyanate groups.

Even where the linkages are of a single type, the composition may be a copolymer such as a copolyester, copolyether, etc. Copolymer formation is a useful method for modifying the properties of the "soft" segment, such as for reducing the melting point to a useful level. The polymers may be substituted with halogen, alkyl, and similar groups which do not interfere with the subsequent polymerization under the conditions used.

In the practice of the invention, the proper reactants are chosen to produce a low molecular weight polymer having active hydrogen-containing end-groups. Compounds with the desired combination of molecular weight and low-melting point are usually obtained by interrupting the structure frequently with side chains or by introducing atoms other than carbon atoms into the main polymer chain. The isocyanate interrupted polymers can be conveniently made by reacting a polymer such as a polyether, etc., with less than one equivalent of the diisocyanate. In such cases the capping reaction follows as an extra step. Among suitable polymeric materials are polyethers, i.e., poly(tetramethylene oxide), poly(propylene oxide) and polydioxolane; polyesters, i.e., copolyester from ethylene glycol and a mixture of adipic and azelaic acids; polyamides, i.e., copolyamide from sebacic acid, hexamethylenediamine and N,N'-diethylhexamethylenediamine; polyurethanes, e.g., copolyurethane from N,N'-diethylhexamethylenediamine and N,N'-dimethylhexamethylenediamine, reacted with the bischloroformate of 3,3-dimethylpropanediol; polyhydrocarbons, e.g., diaminopolyisoprene; polysiloxanes, polysulfides, and the like, and those which are chain interrupted with aromatic diisocyanate radicals such as poly(tetramethylene oxide) interrupted with 2,4-tolylene diisocyanate.

The segmented polymeric products of the present invention are formed according to conventional polymerization techniques by reacting a molar excess of a diisocyanate of the class defined below with one or more of these polymeric compounds. Thus the polymer is provided at each end with terminal isocyanate groups.

In accordance with the invention the aromatic diisocyanates used to cap the "soft" segments conform to the following structural formula:

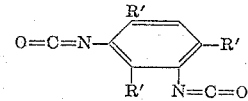

wherein R' is lower alkyl. Such diisocyanates are formed by established procedures, i.e., reaction of the corresponding diamine with phosgene. Typical detailed examples appear in U.S. application Serial No. 574,601 and in Examples I and II below. Preferred diisocyanates are 2,4,6-trimethyl-1,3-phenylene diisocyanate and 2,4,6-triisopropyl-1,3-phenylene diisocyanate. It should be apparent that the diisocyanates used for capping need not all be of the hindered variety. Mixtures of hindered and unhindered diisocyanates may be used and are intended to be within the scope of the present invention. Of course, as greater proportions of unhindered diisocyanates are used the light stability of the final product is adversely affected.

In the preparation of segmented polymers of the present invention the isocyanate-terminated "soft" segments are then united with a "chain-extender." The isocyanate-"chain-extender"-isocyanate portion of the resulting polymer chain constitutes the "hard" segment. The "hard" segment provides an excellent "tie point" for joining the low-melting, amorphous "soft" segments, so that a polymer is produced having good elastic properties, i.e., a high tensile recovery and a low stress decay. The chain-extender is preferably hydrazine or an organic diamine such as ethylene diamine, bis(p-aminophenyl)-methane, bis(4-aminocyclohexyl)methane, and 2,5-dimethylpiperazine. However, the chain-extender is by no means limited to such compounds. It may also be water or a diol, i.e., ethylene glycol, hexamethylene glycol, 1,4-bis(hydroxymethyl)cyclohexane, and p,p'-isopropylidenediphenol.

It should be apparent that the chain-extender portion of the "hard" segment may be controlled as to length by adding additional amounts of diisocyanate together with the chain-extender in the chain-extending reaction of the isocyanate-terminated polymer. When no added quantity of diisocyanate is used, the length of the "hard" segment will be at a minimum. As the "hard" segment becomes shorter, it is preferred that it be a unit of a higher melting polymer, preferably melting above 250° C. The sole requirement is that the diisocyanate be able to react with the chain-extender portion to form a polymer melting above 200° C. when the molecular weight is high enough to be in the fiber-forming range.

The reaction of the diisocyanate with the polymer of the "soft" segment is carried out in the usual manner, that is, by admixing the anhydrous reagents at steam bath temperatures. However, the polymerization of this product with a chain-extender such as a diamine is generally carried out at temperatures close to room temperature.

Although various methods of polymerization may be used in the reaction of the diamine with the macrodiisocyanate, solution polymerization is the preferred method. This method involves dissolving the diamine in a solvent and one or more complementary reactants in separate portions of the same solvent and then mixing the solutions under conditions suitable for forming high molecular weight polymers. The solvent is usually one which is relatively inert to the reactants. Suitable solvents for use in this process include N,N-dimethylformamide, N,N-dimethylacetamide, tetrahydrofuran, dimethylsulfoxide, and mixtures of acetone with N,N-dimethylformamide. To facilitate formation of high molecular weight polymers, acid acceptors are used in the system when an acid is liberated by the reaction, such as in the reaction of the bischloroformate of a polyether glycol, the bischloroformate of ethylene glycol and 2,4,6-trimethyl-1,3-phenylenediamine to form a segmented elastomer within the scope of this invention. Dimethylformamide and dimethylacetamide are the preferred solvents for use in the practice of this invention, especially since solutions suitable for the spinning of fibers may be made directly in these solvents.

For optimum results, the polymers of this invention should have an inherent viscosity of the order of 1.0–4.0 or above, although polymers having inherent viscosities as low as 0.5 are useful. Polymers in the lower molecular weight range are useful in certain applications such as in prepartion of coatings and molded objects. However, the ones of particular interest are those which have molecular weights in the fiber-forming range, i.e., above about 10,000. Inherent viscosity is defined as $$\frac{\ln \eta_r}{C}$$

in which $\eta r$ is the viscosity of a dilute solution of the polymer divided by the viscosity of the solvent in the same units and at the same temperature, and C is the concentration in grams of the polymer per 100 ml. of solution. The inherent viscosities recorded herein are measured at 20° C. at a concentration of 0.5 gram per 100 ml. of solution.

When the polymerization reaction has been carried out in a solvent in which the reaction product remains soluble, films or coatings may be formed by pouring or otherwise applying a solution to form a thin film and allowing the solvent to evaporate.

An outstanding feature of this invention is that it is possible to prepare fairly concentrated solutions of the polymers, and such solutions can be used directly in the preparation of filaments, bristles, and similar articles. Filaments can be prepared from the polymers by dry or wet spinning which have a denier smaller than 300 which is the finest denier currently made of rubber. Conventional conditions are used for dry spinning except that the elastic filaments usually have to be talced or lubricated, usually with water, because they tend to be somewhat tacky immediately after extrusion. Spinning speeds are usually lower than those used in some commercial dry spinning processes for textile filaments, although speeds in excess of 300 yards per minute have been attained with elastic filaments, which represent excellent productivity for filaments of this type. It is usually found that superior elastic filaments are produced according to this invention by dry spinning rather than by wet spinning.

When wet spinning, the spinning speeds are usually lower, but this procedure has definite advantage when large denier filaments are being prepared. The preferred solvents for wet spinning are N,N-dimethylformamide and N,N-dimethylacetamide, and these solutions are usually extruded into a hot water bath. The spinning solutions ordinarily contain from 10 to 25% of polymer. For spinning a fine denier filament yarn, dry spinning may be used in the 1–30 denier range. Wet spinning may be used for 20–300 denier. Elastic filaments from both types of spinning are tacky after spinning and may be coalesced to yield filaments of larger denier.

Polymers of the present invention are particularly useful in the production of elastic fibers which resist discoloration on exposure to light. Substantially linear polymers capable of forming filaments with a tensile recovery of above 90% and a stress decay below 20% without a curing or cross-linking treatment may be used for production of such elastic fibers. "Tensile recovery" is the percentage return to the original length within one minute after the tension has been released from a fiber sample which has been elongated 50% at the rate of 100% per minute, and held at 50% elongation for one minute. "Stress decay" is the percent loss in stress in a yarn one minute after it has been elongated to 50% at the rate of 100% per minute. "Polymer melt temperature" is the minimum temperature at which a sample of the polymer leaves a wet, molten trail as it is stroked with moderate pressure across a smooth surface of a heated brass block. The "polymer melt temperature" has sometimes in the past been referred to as the "polymer stick temperature." The "fiber stick temperature" is the temperature at which the fibers will just stick to a heated brass block when held against the surface of the block for 5 seconds with a 200 g. weight. Of the suitable polymers which are composed of "soft" segments, and "hard" segments alternating in the polymer chain, the preferred elastomeric products for fiber applications have a fiber stick temperature above about 150° C., and the "soft" segment of the preferred elastomers have molecular weights between 800 and 3500.

The following examples are cited to illustrate the invention.

*Example 1*

A solution of 150 parts of 2,4,6-trimethyl-1,3-phenylene diamine in 1300 parts of o-dichlorobenzene is added gradually to a solution of 250 parts of phosgene in 1300 parts of o-dichlorobenzene while agitating. The temperature is maintained between —5° C. and 5° C. After all the diamine solution is added, the temperature is gradually raised to 25° C. The reaction mass is then heated to reflux while a stream of phosgene gas is passed through it. After refluxing 6 hours, the phosgene flow is discontinued, the solution cooled to 100° C. and nitrogen is passed through to remove phosgene. The o-dichlorobenzene is then distilled off under vacuum. The residue is then distilled at a pressure of 0.65 to 0.85 mm. of mercury. 115 parts of 2,4,6-trimethyl-1,3-phenylene-diisocyanate boiling at 103 to 107° C. is obtained. The distillate solidifies to an off-white solid which melts at 58 to 60° C. The solid analyzes 41.4% NCO (theory 41.58%). It may be recrystallized from benzene to yield practically white crystals.

Three moles of dry poly(tetramethylene ether) glycol having an average molecular weight of approximately 1000 is reacted with 2 moles of 2,4-tolylene disocyanate by heating for 3 hours on the steam bath under nitrogen. A low molecular weight polymer having hydroxyl end groups and containing an average of 3 poly(tetramethylene ether) groups per molecule is obtained. 48.4 grams of this "trimer" is reacted under nitrogen with 6.1 grams of 2,4,6-trimethyl-1,3-phenylene diisocyanate in 30 ml. of xylene for 2 hours at 125–130° C. A trimer terminated with isocyanate groups is thereby produced. The solvent is removed under reduced pressure and the residue is dissolved in 150 ml. of N,N-dimethylacetamide. To this solution at 0° C. is added a solution of 0.75 gram of hydrazine hydrate in 15 ml. of dimethylacetamide. After 10 minutes the highly viscous solution containing 25% solids is dry spun into fibers at 90° C. in the usual manner. The as-spun fibers are elastomeric and have a tenacity of 0.51 gram per denier, an elongation of 870%, and initial modulus of 0.05 gram per denier, a tensile recovery of 98%, and a stress decay of 5.7%.

After a boil-off for 30 minutes in an aqueous solution containing 0.5% of sodium lauryl sulfate, followed by a distilled-water rinse, 30-filament yarn samples made from the above fibers are exposed to ultraviolet light in a Fade-Ometer, a testing instrument made by the Atlas Electric Devices Company. The exposure is made to a Pyrex-enclosed carbon arc, 14% of the light from which is in the ultraviolet region of 3000–4300 Angstroms. The samples are placed at a distance of 8 inches from the light source. After 41 hours of exposure no noticeable discoloration develops. A similarly prepared yarn in which p,p'-methylene diphenyl diisocyanate is used for terminating the polyether glycol "trimer," is exposed in the Fade-Ometer. With this yarn a definite yellowing is apparent after 4 hours exposure, the discoloration increasing with continued exposure.

Films cast from the dimethylacetamide solutions of the above polymers also show that the polymer of the present invention has better light stability than the control polymer.

When attempt is made to substitute durylene diisocyanate for 2,4,6-trimethyl-1,3-phenylene diisocyanate in the above example, the resulting polymer is insoluble, i.e. less than 1% of polymeric product can be dissolved.

*Example II*

The compound 2,4,6-triisopropyl-1,3-phenylene diisocyanate is prepared by dissolving 60 grams of 2,4,6-triisopropyl-1,3-phenylenediamine (Chemical Abstracts, vol. 38, p. 723) in 500 ml. of xylene heating to 90° C. and passing dry hydrogen chloride into the hot solution with stirring. After 6 hours the precipitated diamine dihydrochloride is filtered off and washed with a little xylene to remove traces of unreacted diamine. The dihydrochloride is suspended in 500 ml. of xylene, the mixture heated to 120° C. and phosgene is passed over the suspension until the latter is clear (approximately 7 hours). After removal of the xylene under reduced pressure the 2,4,6-triisopropyl, 1,3-phenylene diisocyanate is distilled at 100° C. under 0.125 mm. pressure.

32.1 grams of the "trimer" of Example I is then reacted under nitrogen with 5.72 grams of 2,4,6-triisopropyl-1,3-phenylene diisocyanate for 2 hours at 110° C. The polymer terminated with isocyanate groups is dissolved in 100 grams of dimethylformamide at 50°–70° C. The polymer solution is added slowly with vigorous stirring to 0.4 gram of hydrazine hydrate in 30 grams of dimethylformamide until a viscous solution is obtained. The solution is concentrated to about 35% solids. The high solubility observed is surprising. The polymer is dry spun into 30-filament yarn (over all denier 617, approximately 20 denier per filament) at about 90° C. in the usual manner. The fibers are elastomeric and have a tenacity of 0.51 gram per denier, an elongation of 840%, an initial modulus of 0.03 gram per denier, a tensile recovery of 99%, and a stress decay of 3.7%. On exposure in the Fade-Ometer the yarn shows no discoloration after 21 hours.

*Example III*

Dry poly(tetramethylene ether) glycol having an average molecular weight of approximately 1000 is reacted with 2,4-tolylene diisocyanate in a 2:1 molar ratio. A low molecular weight polymer having hydroxyl end groups and containing an average of 2 polyether groups per molecule is obtained. 10.6 grams of this "dimer" are reacted with 2.0 grams of 2,4,6-trimethyl-1,3-phenylene diisocyanate in 20 ml. of xylene for 2½ hours at 125–130° C. under a blanket of nitrogen to provide the glycol with isocyanate ends. The xylene is removed under reduced pressure, and the viscous dimer is dissolved in 110 ml. of dimethylacetamide. To the cooled isocyanate-terminated dimer solution is added a solution of 0.25 gram of hydrazine hydrate in 5 ml. of dimethylacetamide. Solvent is removed under reduced pressure until the solution approximates 25% solids. Films cast from this solution are elastic, transparent and tough. On exposure in the Fade-Ometer as in the preceding example they show no discoloration after 39 hours. A similarly prepared film in which p,p'-methylene diphenyl diisocyanate is used for terminating, shows yellowing after 4 hours' exposure in the Fade-Ometer.

In addition to being soluble in dimethylacetamide, as illustrated above, the polymers are also soluble in dimethylformamide.

*Example IV*

20 grams of the "dimer" of Example III and 5.72 grams of 2,4,6-triisopropyl-1,3-phenylene diisocyanate are reacted for 4 hours under nitrogen at 110° C. The polymer is dissolved in 50 grams of dimethylformamide as in the preceding example, and is added slowly with stirring to 0.4 gram of hydrazine hydrate in 100 grams of dimethylformamide. The solution obtained is not viscous. After the addition of approximately 0.05 gram of hydrazine hydrate, the viscosity improves. A film cast from such a solution is tough and snappy and is soluble in chloroform/methanol (20/1). It is observed that polymers obtained from 2,4,6-triisopropyl-1,3-phenylene diisocyanate are swollen by methanol, in contrast to similar polymers from 2,4,6-trimethyl-1,3-phenylene diisocyanate.

*Example V*

5.45 grams of the "dimer" identified in Example III, 1.01 grams of 2,4,6-trimethyl-1,3-phenylene diisocyanate and 20 ml. of xylene are charged to a three-necked flask equipped with a nitrogen bleed and stirrer. The mass is heated, with agitation, for two hours at a temperature controlled within the limits of 125–130° C. Xylene is then distilled off under reduced pressure. The isocyanate-terminated dimer so formed is redissolved, at room temperature, in 32.5 ml. of dimethylformamide.

After cooling the solution to 3–5° C., a solution of 0.15 gram of ethylene diamine in 5 ml. of dimethylformamide is added. A polymeric product separates. It is redissolved by addition of 20 ml. of dimethylformamide. A film is cast from the solution. It is boiled-off in water containing 0.5% of sodium lauryl sulfate. The film is hydrophobic in character and shows no discoloration after 24 hours' exposure to ultra-violet light in the Fade-Ometer.

0.870 gram of 2,4-tolylene diisocyanate is substituted for the diisocyanate employed above, and the example is repeated. The film, so prepared, is brown after only 20 hours exposure in the Fade-Ometer.

*Example VI*

0.525 gram of bis(4-aminocyclohexyl)methane is substituted for the ethylene diamine used in each polymer preparation of Example V. The film formed from the polymer prepared with 2,4,6-trimethyl-1,3-phenylene diisocyanate exhibits no discoloration on 24 hours' exposure to the ultraviolet light of the Fade-Ometer. The film formed from the polymer prepared with 2,4-tolylene diisocyanate is discolored badly after only 20 hours exposure.

*Example VII*

0.285 gram of dimethylpiperazine is substituted for the ethylene diamine used in each polymer preparation of Example V. Light exposure tests give results identical to those reported in Example VI.

The polymer of the present invention may be broadly defined as one wherein repeating component radicals contains two

groups, attached in meta relationship through the nitrogen to a phenylene nucleus, upon which nucleus three lower alkyl groups are substituted on each of the carbons adjacent to those carbons to which the nitrogen is attached. By "lower alkyl" is meant an alkyl radical containing 1 to 4 carbons and being free from tertiary carbon atoms. The presence of this repeating component radical, permits formation of soluble polymers. Furthermore, the repeating component radical permits formation of soluble, fiber-forming polymers from low molecular weight "prepolymers." In addition improved stability against discoloration on exposure to light is exhibited by shaped articles produced from the polymers of the present invention as compared with these closely related polymers.

Many equivalent modifications will be apparent to those skilled in the art from a reading of the above without a departure from the inventive concept. This application is a continuation-in-part of United States application 574,603, filed March 29, 1956.

We claim:

1. An elastic essentially linear block polymer having in fiber form, a tensile recovery of above 90% and a stress decay below 20% in the absence of a cross-linking treatment, and having the following repeating structure

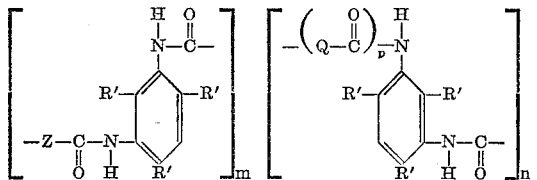

wherein R' is lower alkyl, Z is the residue after removal of terminal active hydrogen from a polymer selected from the group consisting of polyesters, polyethers, polyurethanes, and polyamides, said polymer melting below 60° C., having a molecular weight above 700 and containing terminal radicals possessing active hydrogen with any radicals in said residue being non-reactive with isocyanate, $p$ is one, $m$ and $n$ are small whole numbers in the range of from 1 to about 10, Q is a divalent radical selected from the group consisting of hydrazo and organic diamino, any radicals in said divalent radical being non-reactive with isocyanate and the structure

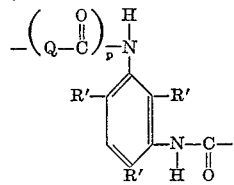

represents a repeating unit of a polymer having a melting point above about 200° C. at a molecular weight above 10,000.

2. The polymer of claim 1 wherein Q is an organic diamino radical, $p$ is one and R' is methyl.

3. The polymer of claim 1 wherein Q is hydrazo and $p$ is one.

4. The polymer of claim 1 wherein Q is hydrazo, $p$ is one and R' is isopropyl.

5. The polymer of claim 4 wherein Z is the residue of a polyether glycol.

6. The polymer of claim 4 wherein Z is the residue of a polyether glycol interrupted with urethane linkages.

7. A solution comprising the polymer of claim 1 in dimethylformamide.

8. A solution comprising the polymer of claim 1 in dimethylacetamide.

9. A filament produced from the polymer of claim 1.

10. A filament produced from the polymer of claim 1 having a denier of up to 300.

11. A dry-spun filament of 1 to 30 denier produced from the polymer of claim 1.

12. A wet spun filament of 20 to 300 denier produced from the polymer of claim 1.

13. The polymer of claim 1 wherein said first segment comprises about 60–95% by weight of the polymeric product.

14. An elastic block substantially linear polymer having in fiber form a tensile recovery of above 90% and a stress decay below 20% and consisting of first and second segments alternating throughout the chain length, said first segment being

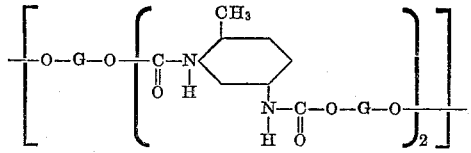

wherein G represents the residue of a poly(tetramethylene ether) glycol of molecular weight about 1000 remaining upon removal of terminal hydroxyl groups and said second segment being

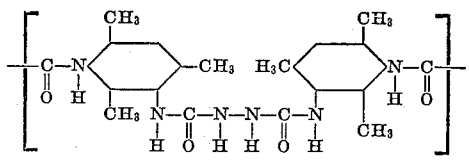

15. A solution comprising the polymer of claim 14 in dimethylformamide.

16. An elastic essentially linear block polymer having in fiber form, a tensile recovery of above 90% and a stress decay below 20% in the absence of a cross-linking treatment, and having the following repeating structure:

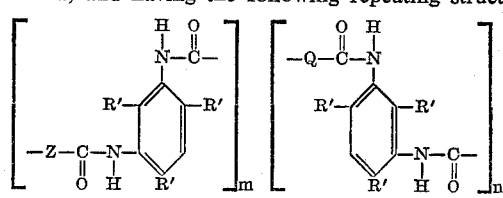

wherein R' is lower alkyl, Z is the residue after removal of terminal active hydrogen from a polymer selected from the class consisting of polyesters, polyethers, polyurethanes and polyamides, said polymer melting below 60° C., having a molecular weight above 700 and containing terminal radicals possessing active hydrogen, any radicals in said residue being non-reactive with isocyanate, m and n are small whole numbers, Q is an organic dioxy radical, any radicals of said dioxy radical being non-reactive with isocyanate, and the structure:

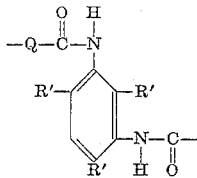

represents a repeating unit of a polymer having a melting point above about 200° C. at a molecular weight above 10,000.

17. An elastic essentially linear block polymer having in fiber form, a tensile recovery of above 90% and a stress decay below 20% in the absence of a cross-linking treatment, and having the following repeating structure:

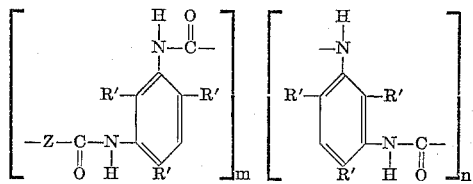

wherein R' is lower alkyl, Z is the residue after removal of terminal active hydrogen from a polymer selected from the class consisting of polyesters, polyethers, polyurethanes and polyamides, said polymer melting below 60° C., having a molecular weight above 700 and containing terminal radicals possessing active hydrogen, any radicals in said residue being non-reactive with isocyanate, m and n are small whole numbers, and the structure:

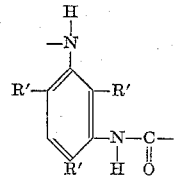

represents a repeating unit of a polymer having a melting point above about 200° C. at a molecular weight above 10,000.

References Cited in the file of this patent

UNITED STATES PATENTS 2,813,775    Steuber _____ Nov. 19, 1957

FOREIGN PATENTS 779,806    Great Britain _____ July 24, 1957

OTHER REFERENCES

Windemuth et al.: German application, Serial No. F16475, printed July 5, 1956 (IVb/39b), 5 pages spec.; no dwg.